(12) United States Patent
Shrum et al.

(10) Patent No.: US 7,686,661 B2
(45) Date of Patent: Mar. 30, 2010

(54) CONNECTION ENCLOSURE ASSEMBLIES, CONNECTOR SYSTEMS AND METHODS FOR FORMING AN ENCLOSED CONNECTION BETWEEN CONDUCTORS

(75) Inventors: Maigan G. Shrum, Willow Spring, NC (US); Jimmy E. Marks, Dunn, NC (US); George W. Pullium, III, Garner, NC (US); Rudolf R. Bukovnik, Chaper Hill, NC (US); Mahmoud K. Seraj, Apex, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 12/183,577

(22) Filed: Jul. 31, 2008

(65) Prior Publication Data

US 2010/0029147 A1 Feb. 4, 2010

(51) Int. Cl.
*H01R 13/52* (2006.01)
(52) U.S. Cl. .................... 439/781; 439/863; 439/521; 439/936; 174/92; 174/66; 174/67
(58) Field of Classification Search .................. 439/781, 439/863, 521, 936, 782, 367, 371; 174/92, 174/66, 67, 59, 50, 58, 65 R, 93
See application file for complete search history.

(56) References Cited

U.S. PATENT DOCUMENTS

| 3,112,148 A | 11/1963 | Wochner |
| 3,147,338 A | 9/1964 | Ekvall et al. |
| 3,715,459 A | 2/1973 | Hoffman |

(Continued)

OTHER PUBLICATIONS

Notification of Transmittal of the International Search Report and the Written Opinion of the International Searching Authority, or the Declaration for PCT Application No. PCT/US2009/004276, mailed Oct. 11, 2009.

*Primary Examiner*—Gary F. Paumen
(74) *Attorney, Agent, or Firm*—Myers Bigel Sibley & Sajovec, P.A.

(57) ABSTRACT

An enclosed connection system for connecting first and second elongate electrical conductors includes a transverse wedge connector and an enclosure. The transverse wedge connector includes an electrically conductive first connector member, an electrically conductive second connector member, and a clamping mechanism. The first connector member includes: a first body having inner and outer opposed ends; a first hook portion on the outer end of the first body, the first hook portion defining a first channel to receive the first conductor; and a first abutment portion on the inner end of the first body. The second connector member includes: a second body having inner and outer opposed ends; a second hook portion on the outer end of the second body, the second hook portion defining a second channel to receive the second conductor; and a second abutment portion on the inner end of the second body. The clamping mechanism is selectively operable to displace the first and second connector members relative to one another from an open position to a clamping position to clamp the first conductor in the first channel and between the first hook portion and the second abutment portion and to clamp the second conductor in the second channel and between the second hook portion and the first abutment portion to thereby form a connection. The enclosure is configured to receive and cover the connection and to protect the transverse wedge connector.

18 Claims, 15 Drawing Sheets

U.S. PATENT DOCUMENTS

| | | |
|---|---|---|
| 5,347,084 A * | 9/1994 | Roney et al. .................. 174/92 |
| 5,397,859 A | 3/1995 | Robertson et al. |
| 5,561,269 A * | 10/1996 | Robertson et al. ............. 174/92 |
| 5,594,210 A * | 1/1997 | Yabe ........................... 174/76 |
| 5,763,835 A * | 6/1998 | Huynh-Ba et al. ............. 174/92 |
| 6,169,250 B1 * | 1/2001 | Bolcato ....................... 174/92 |
| 6,333,463 B1 * | 12/2001 | Bukovnik et al. ......... 174/77 R |
| 7,138,580 B2 | 11/2006 | Boutin |
| 7,182,653 B1 * | 2/2007 | Hoxha ....................... 439/783 |
| 7,309,263 B2 * | 12/2007 | Copper et al. ............... 439/781 |
| 7,341,479 B2 | 3/2008 | Boutin |
| 7,432,445 B2 * | 10/2008 | Bird et al. ..................... 174/92 |
| 2007/0270046 A1 | 11/2007 | Copper et al. |
| 2008/0050987 A1 | 2/2008 | Copper et al. |

* cited by examiner

CONNECTION ENCLOSURE ASSEMBLIES, CONNECTOR SYSTEMS AND METHODS FOR FORMING AN ENCLOSED CONNECTION BETWEEN CONDUCTORS

FIELD OF THE INVENTION

The present invention relates to connectors and methods for forming connections and, more particularly, to connection enclosures and methods for connecting elongate electrical conductors.

BACKGROUND OF THE INVENTION

Electrical conductors often must be terminated or joined in various environments, such as underground or overhead. Such conductors may be, for example, high voltage electrical distribution or transmission lines. In order to form such connections, a connector may be employed. For example, in electrical power systems, it is occasionally necessary to tap into an electrical power line. One known system for tapping into an electrical power line is to use a tap connector for electrically connecting a main line electrical cable to an end of a tap line electrical conductor.

One such tap connector, typically referred to as a wedge connector, includes an electrically conductive C-shaped member or sleeve and a wedge. The two conductors are positioned at opposite sides of the C-shaped sleeve and the wedge is driven between the two conductors. This forces the two conductors against the C-shaped sleeve such that they are captured between the wedge and the C-shaped sleeve. Wedge connectors are commonly installed using an explosively driven connecting tool (sometimes referred to as a powder actuated tool). The C-shaped sleeve is held in place on a tool head connected to a tool body including a cartridge chamber. The cartridge chamber accepts a gunpowder shell casing with a powder charge that is activated by striking the casing with a hammer. The explosion drives a ram that forces the wedge portion of the connector between the two conductors.

SUMMARY OF THE INVENTION

According to embodiments of the present invention, an enclosed connection system for connecting first and second elongate electrical conductors includes a transverse wedge connector and an enclosure. The transverse wedge connector includes an electrically conductive first connector member, an electrically conductive second connector member, and a clamping mechanism. The first connector member includes: a first body having inner and outer opposed ends; a first hook portion on the outer end of the first body, the first hook portion defining a first channel to receive the first conductor; and a first abutment portion on the inner end of the first body. The second connector member includes: a second body having inner and outer opposed ends; a second hook portion on the outer end of the second body, the second hook portion defining a second channel to receive the second conductor; and a second abutment portion on the inner end of the second body. The clamping mechanism is selectively operable to displace the first and second connector members relative to one another from an open position to a clamping position to clamp the first conductor in the first channel and between the first hook portion and the second abutment portion and to clamp the second conductor in the second channel and between the second hook portion and the first abutment portion to thereby form a connection. The enclosure is configured to receive and cover the connection and to protect the transverse wedge connector.

According to some embodiments, the enclosure includes: at least one cover member configurable to define an enclosure cavity to receive the transverse wedge connector; and a flowable sealant disposed in the at least one cover member to provide a seal about the transverse wedge connector.

According to embodiments of the present invention, an enclosure assembly for use with a transverse wedge connector and first and second elongate electrical conductors includes at least one cover member configured or configurable to define an enclosure cavity to receive the transverse wedge connector.

According to some embodiments, the enclosure assembly includes a flowable sealant disposed in the at least one cover member to provide a seal about the transverse wedge connector.

According to method embodiments of the present invention, a method for forming an enclosed connection assembly includes providing a connector including an electrically conductive first connector member, an electrically conductive second connector member, and a clamping mechanism. The first connector member includes: a first body having inner and outer opposed ends; a first hook portion on the outer end of the first body, the first hook portion defining a first channel; and a first abutment portion on the inner end of the first body. The second connector member includes: a second body having inner and outer opposed ends; a second hook portion on the outer end of the second body, the second hook portion defining a second channel; and a second abutment portion on the inner end of the second body. While the connector is in an open position, a first conductor is placed in the first channel and a second conductor in the second channel. Thereafter, the clamping mechanism of the connector is selectively operated to displace the first and second connector members relative to one another from the open position to a clamping position to clamp the first conductor in the first channel and between the first hook portion and the second abutment portion and to clamp the second conductor in the second channel and between the second hook portion and the first abutment portion to thereby form a connection. The method further includes covering the connection and protecting the transverse wedge connector with an enclosure.

According to embodiments of the present invention, an enclosure assembly for use with an electrical connector includes a cover member and a flowable sealant. The cover member defines a cover member cavity to receive the connector. The flowable sealant is disposed in the cover member cavity to provide a seal about the connector. A void is defined in the sealant to receive the connector.

According to method embodiments of the present invention, a method for forming an enclosure assembly for use with an electrical connector includes: providing a cover member defining a cover member cavity to receive the connector; providing a flowable sealant in the cover member cavity to provide a seal about the connector; and forming a void in the sealant to receive the connector.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
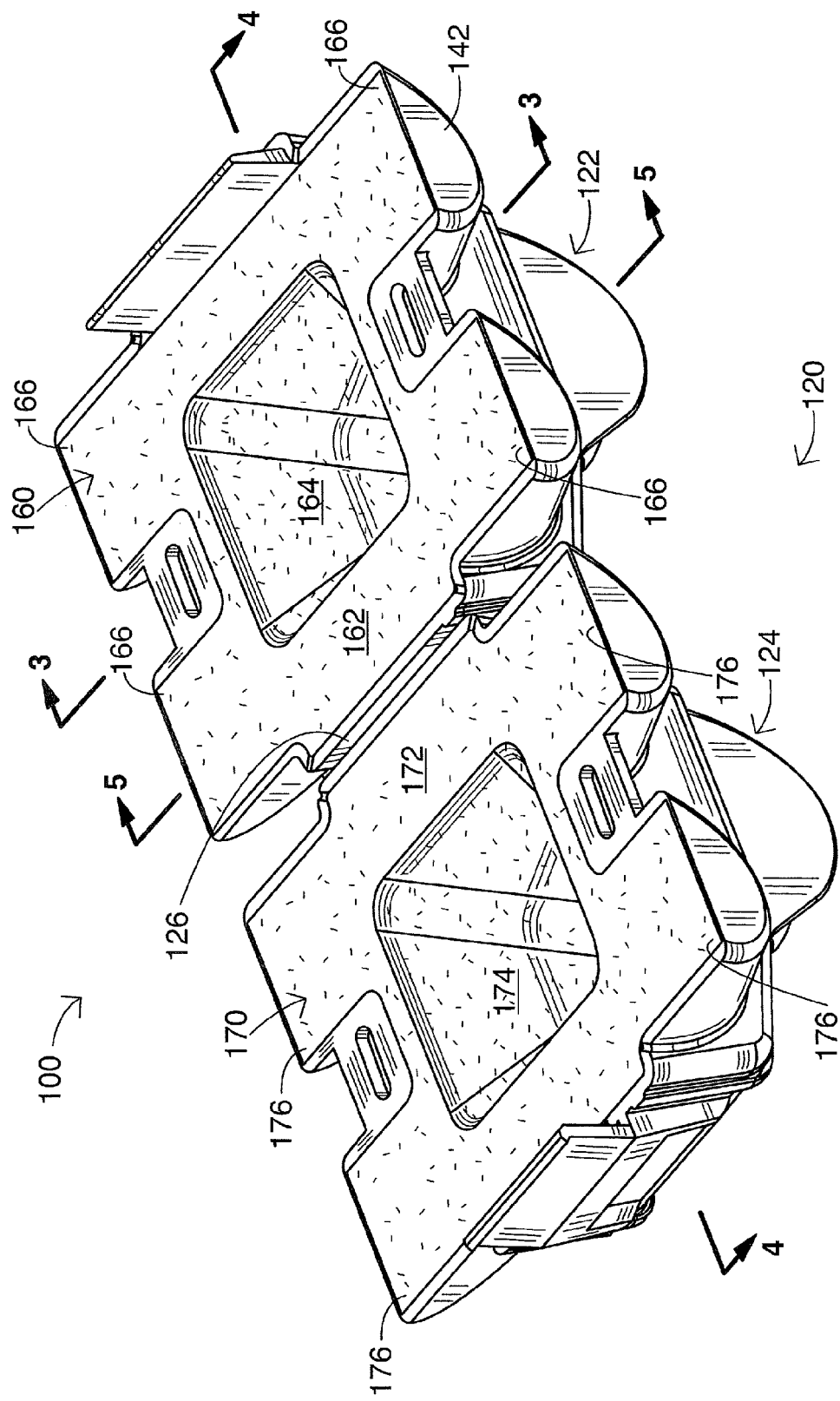
FIG. 1 is a top perspective view of an enclosure assembly according to embodiments of the present invention in an open position.
Figure 2:
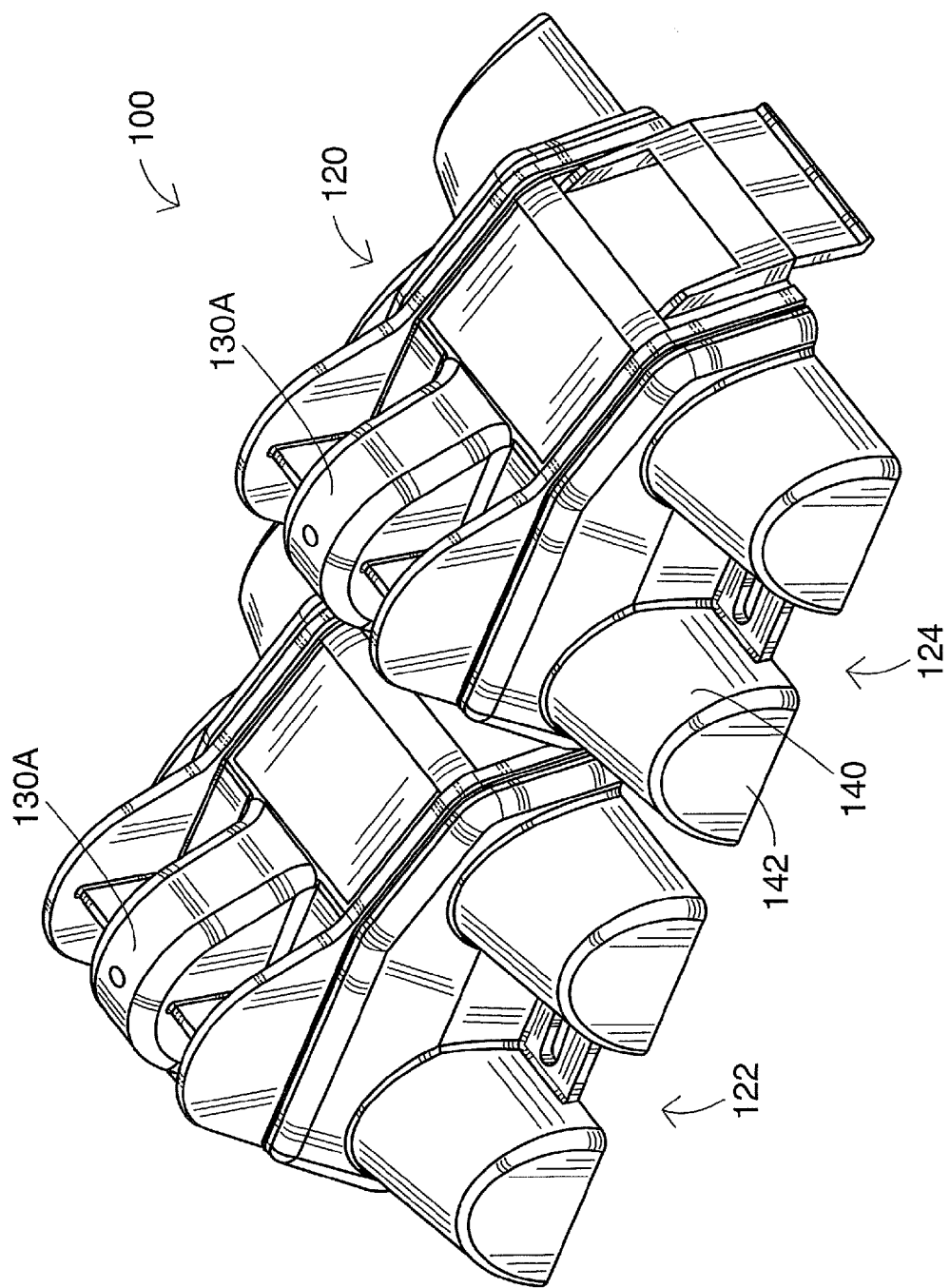
FIG. 2 is a bottom perspective view of the enclosure assembly of FIG. 1.
Figure 3:
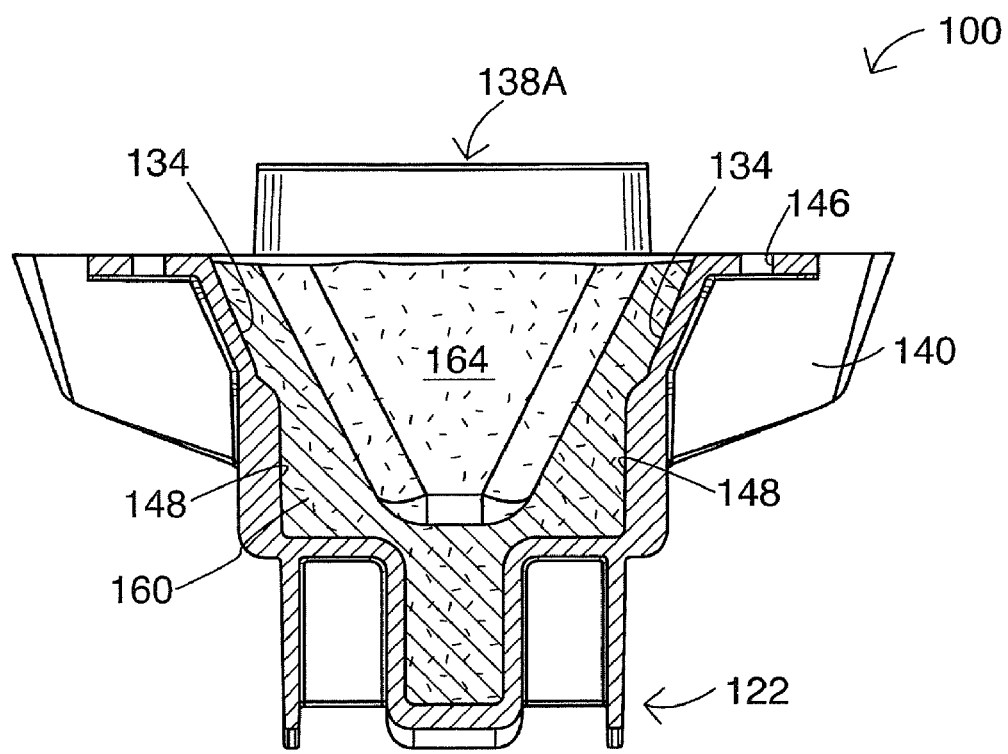
FIG. 3 is a cross-sectional view of the enclosure assembly of FIG. 1 taken along the line 3-3 of FIG. 1.
Figure 4:
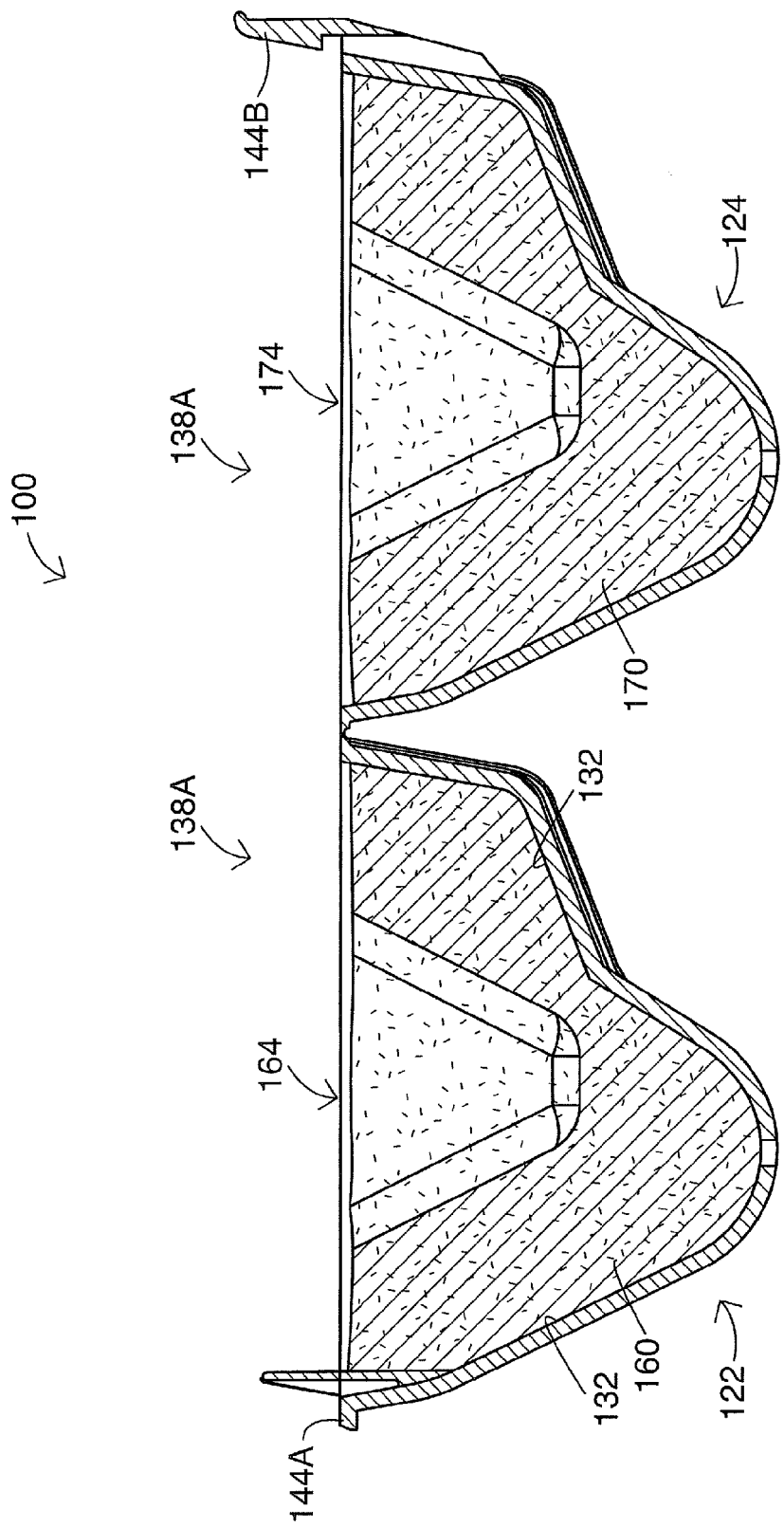
FIG. 4 is a cross-sectional view of the enclosure assembly of FIG. 1 taken along the line 4-4 of FIG. 1.
Figure 5:
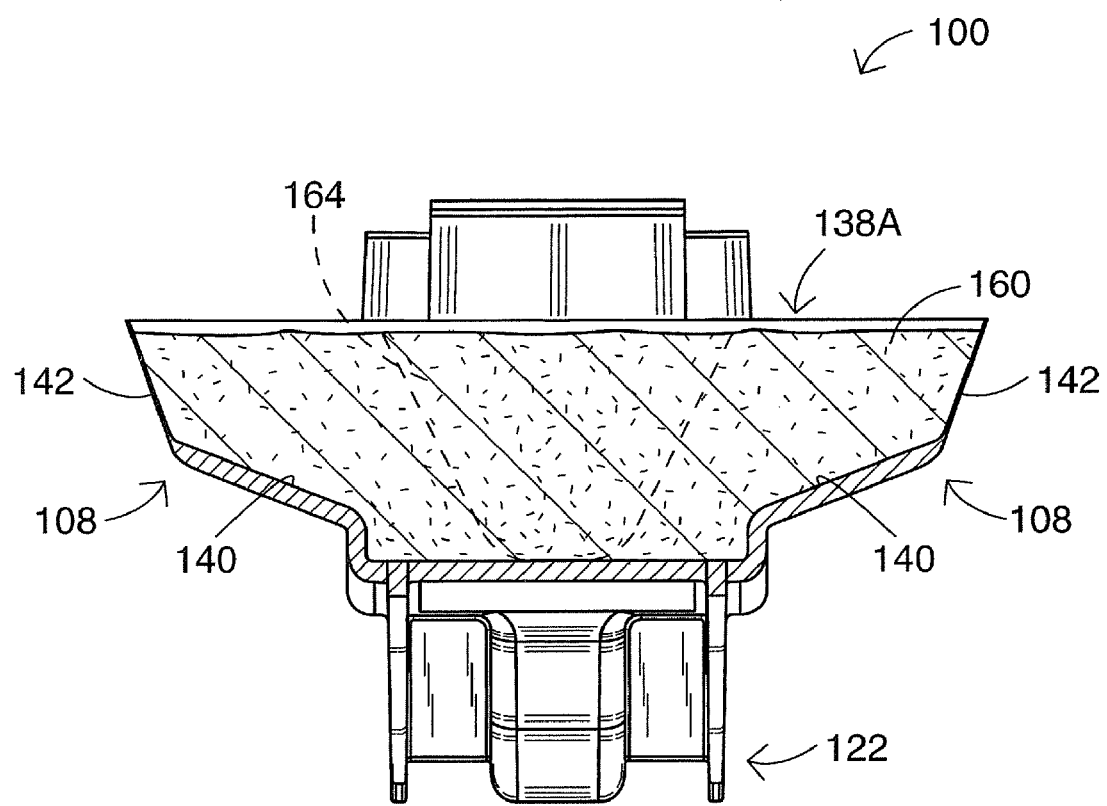
FIG. 5 is a cross-sectional view of the enclosure assembly of FIG. 1 taken along the line 5-5 of FIG. 1.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

With reference to FIGS. 1-15, a connector system 20 (FIG. 11) according to embodiments of the present invention may be used to form an enclosed and protected connection assembly 24 as shown in FIGS. 12-15. The connector system 20 includes a transverse wedge connector 50 (FIGS. 8-10) and an enclosure assembly 100 (FIGS. 1-7). The connector 50 can be used to form a connection 22 (FIGS. 9 and 10) including a pair of elongate conductors 12, 14 (e.g., electrical power lines) mechanically and electrically coupled by the connector 50. Generally, and as described in more detail below, a driver 26 (FIG. 10) may be used to secure the connector 50 on the conductors 12, 14. The enclosure assembly 100 according to embodiments of the present invention may be installed on and surround the connection 22 to form the enclosed connection assembly 24.

Figure 8:
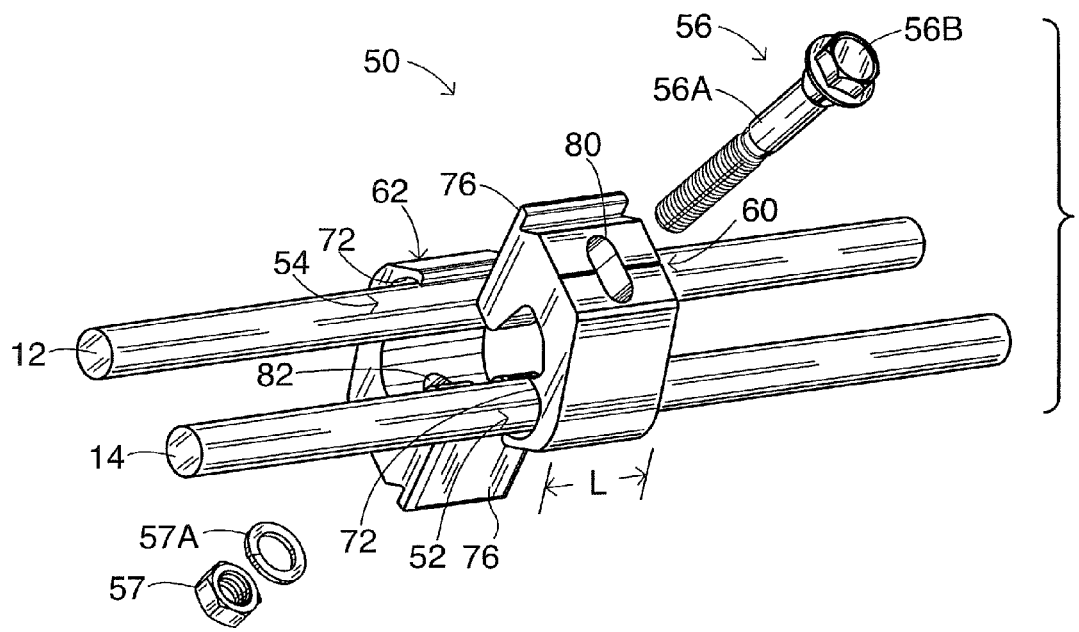
FIG. 8 is an exploded, top perspective view of a transverse wedge connector and conductors according to embodiments of the present invention.
Figure 9:
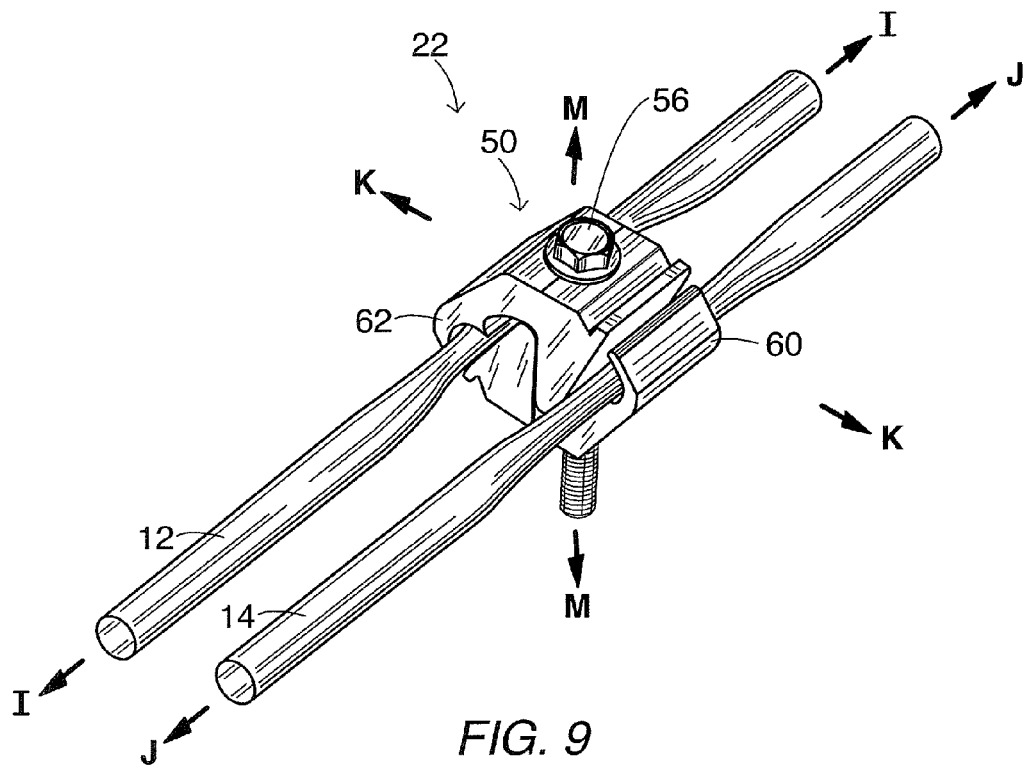
FIG. 9 is a top perspective view of a connection formed from the transverse wedge connector and conductors of FIG. 8.
Figure 10:
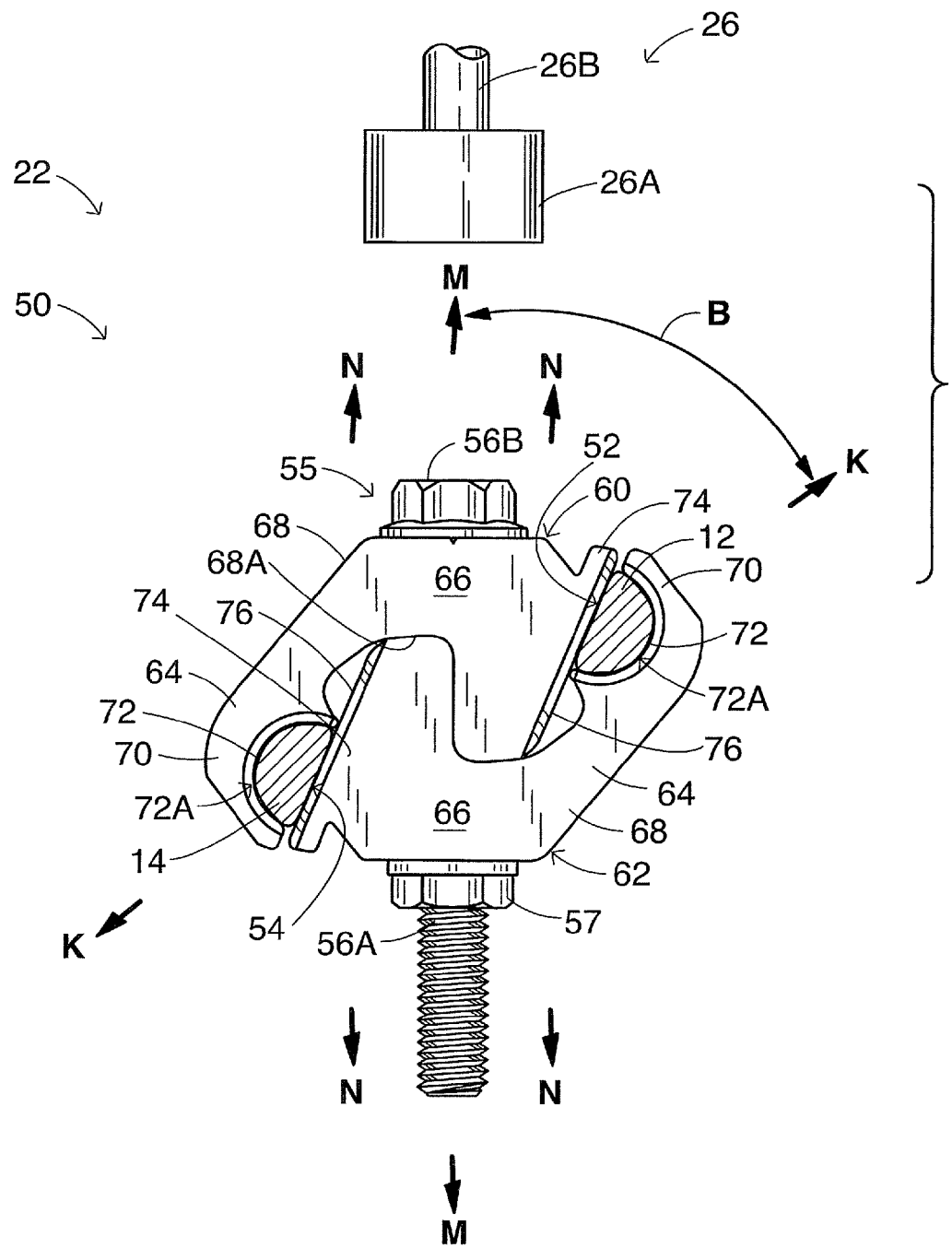
FIG. 10 is a side elevational view of the connection of FIG. 9.

With reference to FIGS. 8-10, the connector 50 includes a first connector member 60 and a second connector member 62, which together define opposed conductor passages 52, 54 for receiving the conductors 12, 14. The connector 50 further includes a clamping mechanism 55 that provides a loading force and secures the connector members 60, 62 in a desired position. According to some embodiments, the connector members 60, 62 have the same configuration, shape or profile except as discussed below. Accordingly, it will be appreciated that the description of one connector member 60, 62 likewise applies to the other.

Each connector member 60, 62 includes a generally U-shaped or J-shaped body. The body includes opposed leg sections 64, 66. The leg sections 64, 66 are joined to by a bend 68 that defines a recess 68A on its inner side.

A U-shaped receiver portion or hook portion 70 extends from the distal end of the leg section 64 opposite the bend 68. The hook portion 70 includes a seat surface 72 defining an arcuate, concave (semi-cylindrical) channel 72A.

A wedge or abutment portion 74 is provided on the leg section 66 opposite the bend 68. The abutment portion 74 has a flat, planar seat surface 76.

In the case of the connector member 60, a non-threaded bore 80 (FIG. 8) extends through the leg section 66. In the case of the connector member 62, a non-threaded bore 82 (FIG. 8) extends through the leg section 66.

The connector members 60, 62 are relatively inverted and nested as shown in FIGS. 9 and 10. That is, the connector members 60, 62 are rotated 180 degrees with respect to one another so that the abutment portion 74 of the connector member 60 is proximate the hook portion 70 of the connector member 62 and the abutment portion 74 of the connector member 62 is proximate the hook portion 70 of the connector member 60. The adjacent seat surfaces 72, 76 face one another and define the respective conductor passages 52, 54 therebetween. The channels 72A of the connector members 60, 62 define respective channel axes I-I and J-J (FIG. 9). A connector longitudinal axis K-K (FIGS. 9 and 10) is transverse to and extends through the axes I-I and J-J. According to some embodiments and as shown, the axes I-I and J-J are parallel to one another and perpendicular to the axis K-K. According to some embodiments, the axes I-I and J-J define a plane in which the axis K-K lies.

A bolt 56 and a nut 57 cooperatively serve as a clamping mechanism 55. The bores 80, 82 are aligned and the shank 56A of the bolt 56 extends through the bores 80, 82. The shank 56A is threaded and threadedly engages the nut 57 but is capable of sliding loosely in the bores 80, 82. A head 56B of the bolt 56 is oversized relative to the bore 80. A lock washer 57A may be positioned between the nut 57 and the connector member 62. Fasteners other that a bolt and nut may be used as a clamping mechanism. Alternatively, the bore 82 may be threaded and cooperate with the bolt 56 to serve as the clamping mechanism, in which case the nut 57 may be omitted.

The clamping mechanism 55 is configured to translate the connector members 60, 62 relative to one another along a translation axis M-M (FIGS. 9 and 10). According to some embodiments, the translation axis M-M is non-perpendicular to the connector longitudinal axis K-K. According to some embodiments, the axis M-M is transverse to the axis K-K. According to some embodiments and as shown, the axis M-M forms an oblique angle B (FIG. 10) with the axis K-K. According to some embodiments, the angle B is between about 40 and 80 degrees.

According to some embodiments and as shown, the connector members 60, 62 together have 180 degree rotational symmetry (i.e., are collectively symmetric under a 180 degree rotation or are reverse mirror images of one another). That is, with the exception of the clamping mechanism 55, the connector 50 is 180 degree rotationally symmetric.

The connector members 60, 62 may be formed of any suitable material. According to some embodiments, the connector members 60, 62 are formed of metal. According to some embodiments, the connector members 60, 62 are formed of aluminum or steel. According to some embodiments, the connector members 60, 62 are formed of aluminum alloy 6061 heat treated in T6 condition. The connector members 60, 62 may be formed using any suitable technique. According to some embodiments, each of the connector members 60, 62 is unitarily formed. According to some embodiments, the connector members 60, 62 are extruded and cut. Alternatively or additionally, the connector members 60, 62 may be stamped (e.g., die-cut), cast and/or machined. Because the connector members 60, 62 are identically configured, only one configuration needs to be produced.

According to some embodiments and as shown, the leg section 64 has a thickness that is less than the thickness of the leg section 66 so that the leg section 64 tends to bend between the bend 68 and the hook portion 70 when the connector 50 is loaded against the conductors 12, 14.

According to some embodiments, the radius of curvature of the hook portion seat surfaces 72 is between about ⅛ and ¾ inch. According to some embodiments, each of the seat surfaces 72 extends along an arc of between about 120 and 180 degrees.

According to some embodiments, the width of each planar abutment portion seat surface 76 is between about 1 and 2 inches.

According to some embodiments, the ratio of the length L (FIG. 8) of each channel 72A to the outer diameter of the conductor 12, 14 to be received is between about 2 and 25. According to some embodiments, the depth of the channels 72A is between about ⅛ and 1.2 inches.

Alternative and additional features and configurations of transverse wedge connectors that may be suitable for use in place of the connector 50 are disclosed in U.S. Pat. No. 7,182,653 to Hoxha and U.S. Pat. No. 7,309,263 to Copper et al., the disclosures of which are incorporated herein by reference.

Figure 11:
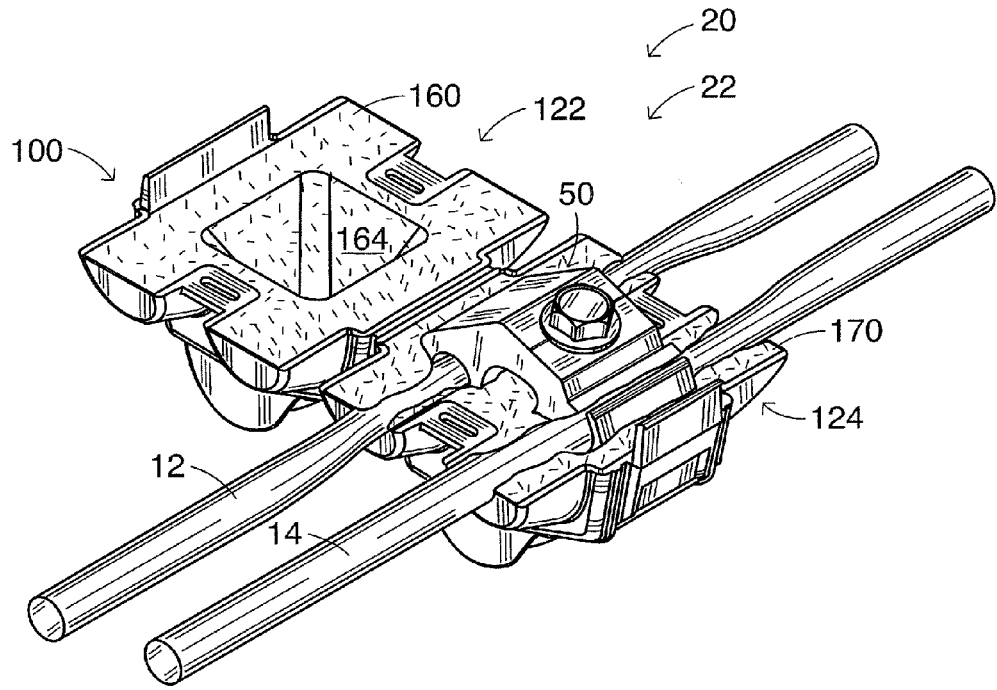
FIG. 11 is a top perspective view of the connection of FIG. 10 partially mounted in the enclosure assembly of FIG. 1.
Figure 12:
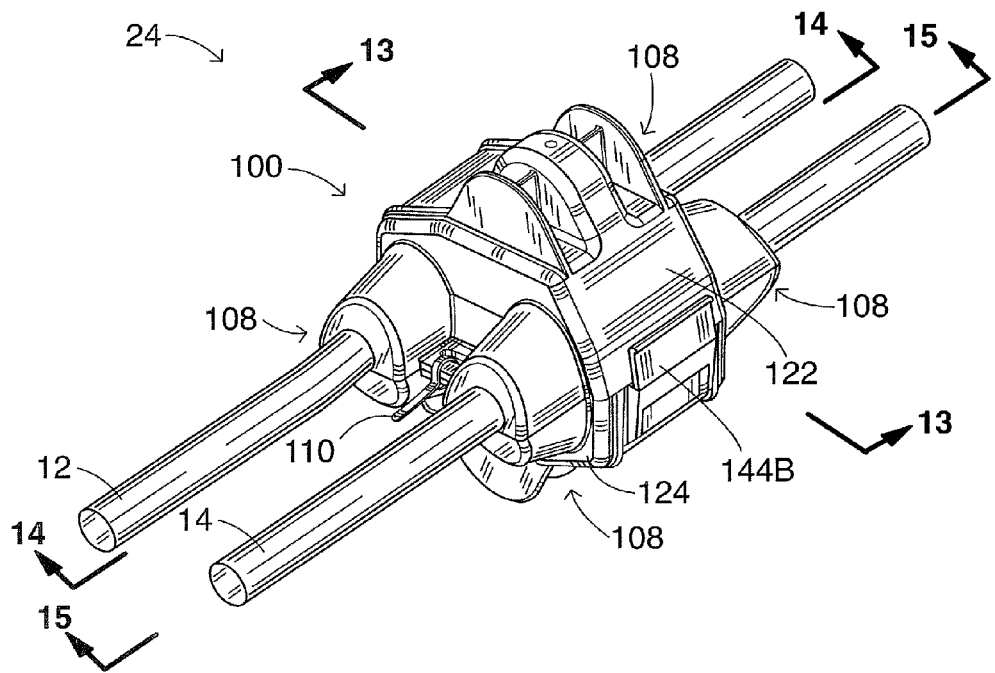
FIG. 12 is a top perspective view of an enclosed connection assembly including the connection of FIG. 10 and the enclosure assembly of FIG. 1.

With reference to FIGS. 1-7, the sealant-filled enclosure 100 includes a housing 120 and masses of sealant 160, 170 disposed therein. According to some embodiments, and as discussed in more detail below, the sealant 160, 170 may be a gel. The housing 100 includes a first shell or cover member 122 and a second shell or cover member 124 joined to one another by a hinge 126 and adapted to move between an open position as shown in FIGS. 1 and 11 and a closed position as shown in FIGS. 12-15. In other embodiments, the cover members are not hinged. In the open position, the enclosure assembly 100 can receive the connection 22 and adjacent portions of the conductors 12, 14. In the closed position, the enclosure assembly 100, including the masses of sealant 160, 170, may operate to seal about and protect the connection 22. In the closed position, the enclosure assembly 100 defines an enclosure cavity 106 (FIGS. 13 and 15) and opposed pairs of ports 108 communicating with the enclosure cavity 106. The shape or geometry of the enclosure cavity 106 resembles or substantially conforms that of the connector 50.

Figure 6:
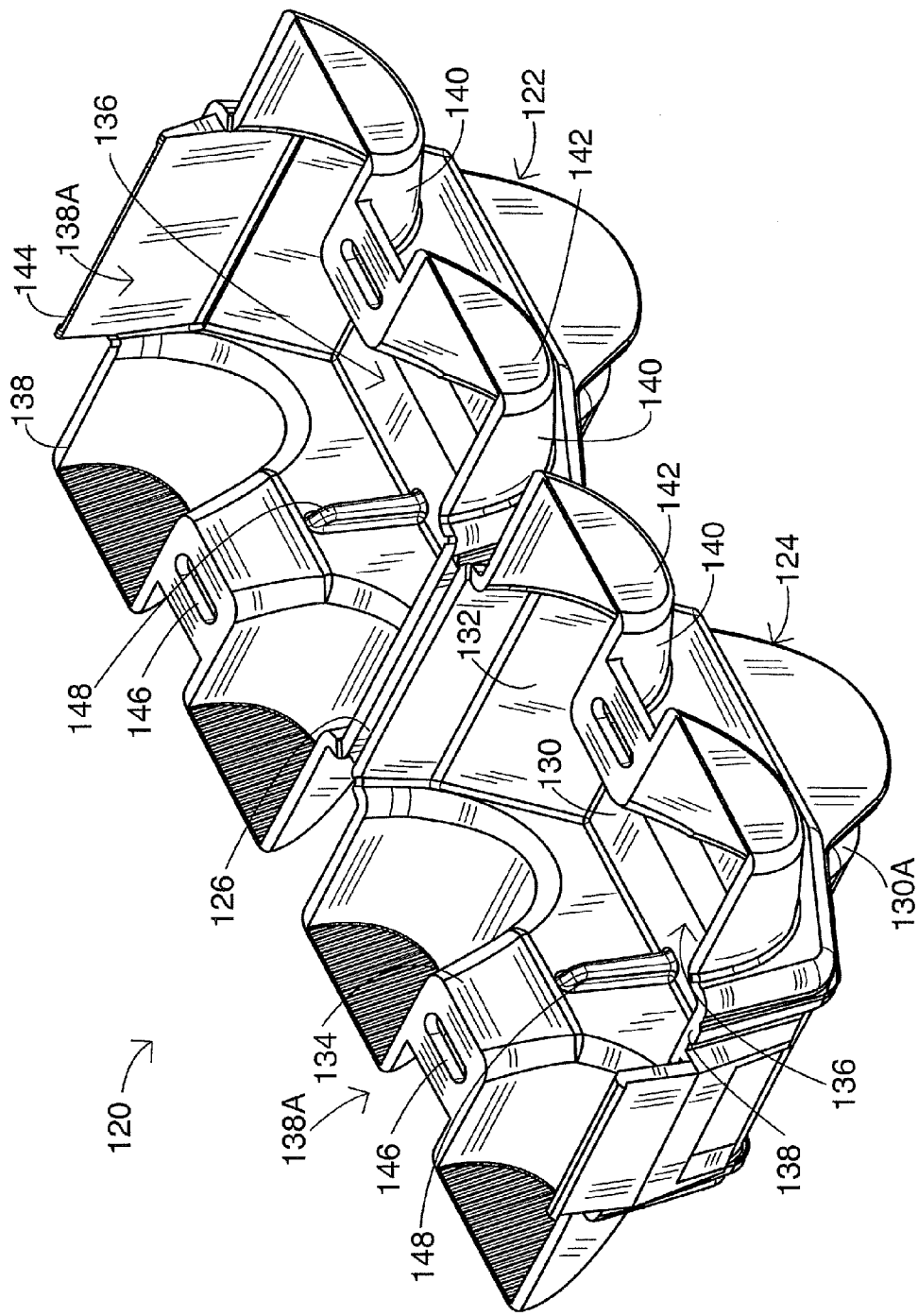
FIG. 6 is a top perspective view of a housing forming a part of the enclosure assembly of FIG. 1.
Figure 7:
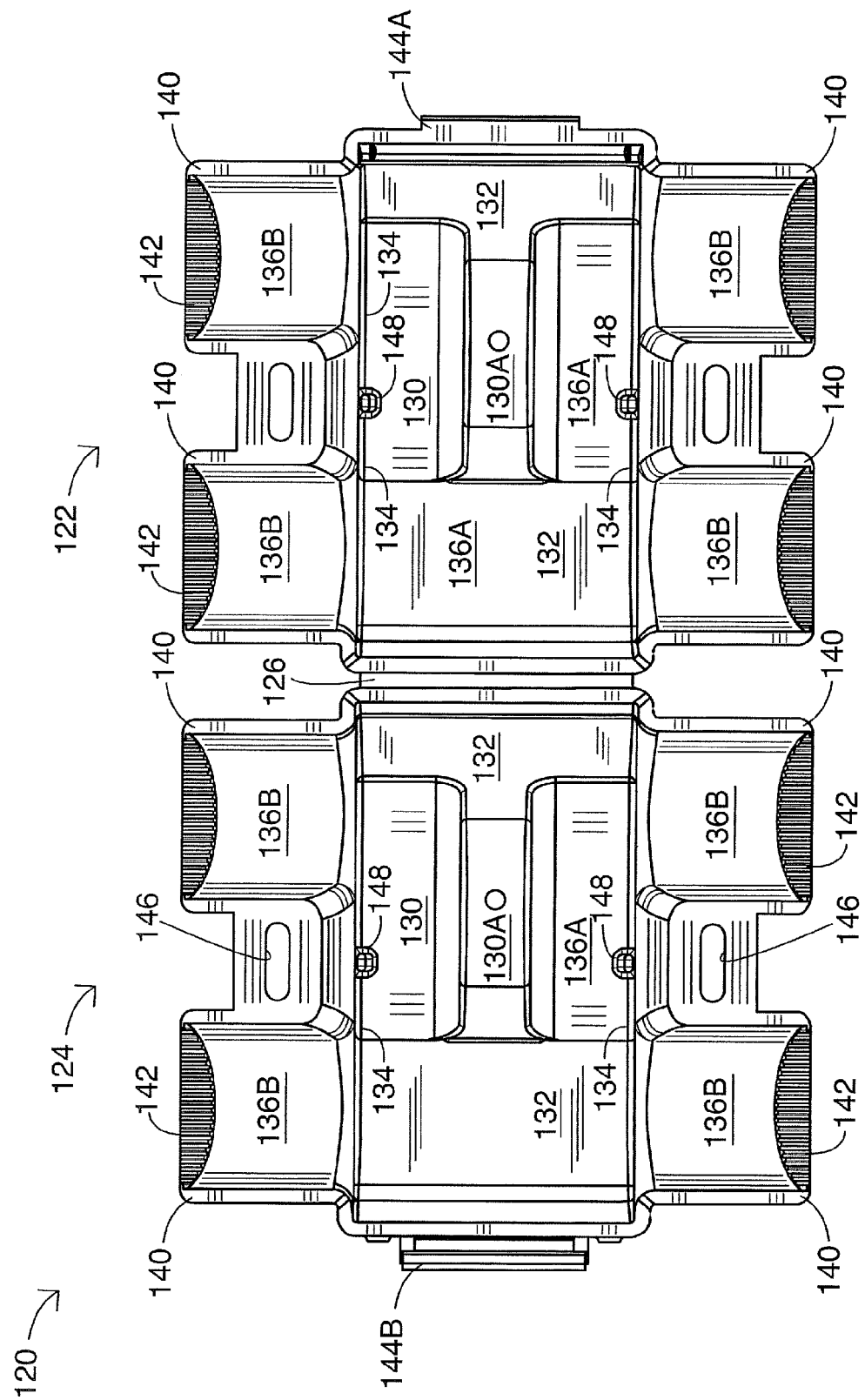
FIG. 7 is a top plan view of the housing of FIG. 6.

Turning to the housing 120 in more detail and as best seen in FIGS. 6 and 7, the cover members 122, 124 are constructed in generally the same manner, except for the configurations of the latch structures and placement relative to the hinge 126. Each cover member 122, 124 includes a bottom wall 130. A dome 130A is defined in the bottom wall 130. Opposed side walls 132 and opposed end walls 134 extend upwardly from the bottom wall 130. Opposed locator ribs 148 extend upwardly from the bottom wall 130 and inwardly from the side walls 132. Opposed pairs of port extensions 140 extend longitudinally from either end of each cover member 122, 124. Each port extension 140 is terminated by a port wall 142. The port walls 142 may be frangible. For example, the port walls 142 may include corrugations comprising a series of fingers joined by relatively thin membranes as shown.

The upper edges of the walls 132, 134 form a perimeter edge 138 defining an opening 138A. The walls 130, 132, 134 and the port extensions 140 of each cover member 122, 124 define an overall cover member chamber or cavity 136 and a front opening 130A communicating with opening 138A. The cavity 136 includes a main cavity portion 136A and conductor port subchannels 136B defined within each port extension 140.

The cover members 122, 124 are pivotably joined by the hinge 126. According to some embodiments, the hinge 126 is a flexible, living hinge. A living hinge may allow for unitary formation of the housing 120, as well as possible cost savings in materials and assembly. Alternatively, other hinge configurations may be employed. For example, the hinge 126 may be replaced by or supplemented with interlocking pivotally coupled hinge structures and/or a pivot pin. Alternatively, the cover members 122, 124 may be non-hinged.

Latch structures 144A, 144B are located on the respective sidewalls 132 opposite the hinge 126. The latch structures 144A, 144B are adapted to cooperate with one another to permanently or releasably secure the housing 120 in the closed position. Opposed tie slots 146 are defined in each cover member 122, 124.

The housing 120 may be formed of any suitable material. According to some embodiments, the housing 120 is formed of an electrically insulative material. In some embodiments, the housing 120 is formed of a vacuum formed or molded polymeric material. The housing 120 may be formed of polypropylene, nylon, polyethylene, ABS and/or PMMA. The housing 120 may be formed of a flame retardant material. The housing material may be any color or transparent.

Prior to use, the sealant 160 may be contained in the cavity 136 of the cover member 122 such that a main sealant portion 162 (FIG. 1) of the sealant is disposed in the main cavity 136 and port sealant portions 166 (FIG. 1) are disposed in the port subchannels 136B.

According to some embodiments, a void 164 (FIG. 1) is defined in the sealant 160. According to some embodiments, the void 164 is open to the opening 138A. According to some embodiments, the sealant 160 fully surrounds the remainder of the void 164 so that the void 164 is spaced apart from cover member 122 on all sides except the top side. According to other embodiments, the void extends fully to the bottom wall 130. According to some embodiments, the sealant 160 fills the cover member cavity 136 to a level near but not fully to the perimeter edge 138. In other embodiments, the sealant 160 fills the cover member cavity 136 substantially fully up to the perimeter edge 138 or to any other desired level. According to some embodiments, the void 164 has sloped side walls that taper outwardly in a direction from the bottom wall 130 to the opening 138A.

According to some embodiments, the void 164 is shaped as an inverted frusto-pyramid. However, the void 164 may be of any other suitable shape.

Prior to use, the sealant 170 may be contained in the cavity 136 of the cover member 124 such that a main sealant portion 172 (FIG. 1) of the sealant is disposed in the main cavity 136 and port sealant portions 176 (FIG. 1) are disposed in the port subchannels 136B.

According to some embodiments, a void 174 is defined in the sealant 170. According to some embodiments, the void 174 is open to the opening 138A. According to some embodiments, the sealant 170 fully surrounds the remainder of the void 174 so that the void 174 is spaced apart from cover member 124 on all sides except the top side. According to other embodiments, the void extends fully to the bottom wall 130. According to some embodiments, the sealant 170 fills the cover members cavity 136 to a level near but not fully to the perimeter edge 138. In other embodiments, the sealant 170 fills the cover member cavity 136 substantially fully up to the perimeter edge 138 or to any other desired level. According to some embodiments, the void 174 has sloped side walls that taper outwardly in a direction from the bottom wall 130 to the opening 138A.

According to some embodiments, the void 174 is shaped as an inverted frusto-pyramid. However, the void 174 may be of any other suitable shape.

The sealants 160, 170 may be any suitable sealants. According to some embodiments, the sealants 160, 170 are gel sealants. As used herein, "gel" refers to the category of materials which are solids extended by a fluid extender. The gel may be a substantially dilute system that exhibits no steady state flow. As discussed in Ferry, "Viscoelastic Properties of Polymers," $3^{rd}$ ed. P. 529 (J. Wiley & Sons, New York 1980), a polymer gel may be a cross-linked solution whether linked by chemical bonds or crystallites or some other kind of junction. The absence of the steady state flow may be considered to be the definition of the solid-like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Gels for use in this invention may be silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat. No. 5,079,300 to Dubrow et al. (hereinafter "Dubrow '300"), the disclosures of each of which are hereby incorporated herein by reference. These fluid-extended silicone gels may be created with non-reactive fluid extenders as in the previously recited patents or with an excess of a reactive liquid, e.g., a vinyl-rich silicone fluid, such that it acts like an extender, as exemplified by the Sylgard® 527 product commercially available from Dow-Corning of Midland, Mich. or as disclosed in U.S. Pat. No. 3,020,260 to Nelson. Because curing is generally involved in the preparation of these gels, they are sometimes referred to as thermosetting gels. The gel may be a silicone gel produced from a mixture of divinyl terminated polydimethylsiloxane, tetrakis (dimethylsiloxy)silane, a platinum divinyltetramethyldisiloxane complex, commercially available from United Chemical Technologies, Inc. of Bristol, Pa., polydimethylsiloxane, and 1,3,5,7-tetravinyltetra-methylcyclotetrasiloxane (reaction inhibitor for providing adequate pot life).

Other types of gels may be used, for example, polyurethane gels as taught in the aforementioned Debbaut '261 and U.S. Pat. No. 5,140,476 to Debbaut (hereinafter "Debbaut '476") and gels based on styrene-ethylene butylenestyrene (SEBS) or styrene-ethylene propylene-styrene (SEPS) extended with an extender oil of naphthenic or nonaromatic or low aramatic content hydrocarbon oil, as described in U.S. Pat. No. 4,369,284 to Chen; U.S. Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be used are EPDM rubber-based gels, as described in U.S. Pat. No. 5,177,143 to Chang et al.

Yet another class of gels which may be used are based on anhydride-containing polymers, as disclosed in WO 96/23007. These gels reportedly have good thermal resistance.

The gel may include a variety of additives, including stabilizers and antioxidants such as hindered phenols (e.g., Irganox™ 1076, commercially available from Ciba-Geigy Corp. of Tarrytown, N.Y.), phosphites (e.g., Irgafos™ 168, commercially available from Ciba-Geigy Corp. of Tarrytown, N.Y.), metal deactivators (e.g., Irganox™ D1024 from Ciba-Geigy Corp. of Tarrytown, N.Y.), and sulfides (e.g., Cyanox LTDP, commercially available from American Cyanamid Co.

of Wayne, N.J.), light stabilizers (e.g., Cyasorb UV-531, commercially available from American Cyanamid Co. of Wayne, N.J.), and flame retardants such as halogenated paraffins (e.g., Bromoklor 50, commercially available from Ferro Corp. of Hammond, Ind.) and/or phosphorous containing organic compounds (e.g., Fyrol PCF and Phosflex 390, both commercially available from Akzo Nobel Chemicals Inc. of Dobbs Ferry, N.Y.) and acid scavengers (e.g., DHT-4A, commercially available from Kyowa Chemical Industry Co. Ltd through Mitsui & Co. of Cleveland, Ohio, and hydrotalcite). Other suitable additives include colorants, biocides, tackifiers and the like described in "Additives for Plastics, Edition 1" published by D.A.T.A., Inc. and The International Plastics Selector, Inc., San Diego, Calif.

The hardness, stress relaxation, and tack may be measured using a Texture Technologies Texture Analyzer or like machine, having a load cell to measure force, a 5 gram trigger, and ¼ inch (6.35 mm) stainless steel probe. For measuring the hardness, for example, of a 20 mL glass vial containing 12 grams of gel, the probe is forced into the gel at the speed of 0.2 mm/sec to a penetration distance of 4.0 mm. The hardness of the gel is the force in grams required to force the probe at that speed to penetrate the gel specified for 4.0 mm. Higher numbers signify harder gels.

The tack and stress relaxation are read from the stress curve generated by tracing the force versus time curve experienced by the load cell when the penetration speed is 2.0 mm/second and the probe is forced into the gel a penetration distance of about 4.0 mm. The probe is held at 4.0 mm penetration for 1 minute and withdrawn at a speed of 2.00 mm/second. The stress relaxation is the ratio of the initial force ($F_i$) resisting the probe at the pre-set penetration depth minus the force resisting the probe ($F_f$) after 1 min divided by the initial force $F_i$, expressed as a percentage. That is, percent stress relaxation is equal to $$\frac{(F_i - F_f)}{F_i} \times 100\%. \qquad 1$$

where $F_i$ and $F_f$ are in grams. In other words, the stress relaxation is the ratio of the initial force minus the force after 1 minute over the initial force. It may be considered to be a measure of the ability of the gel to relax any induced compression placed on the gel. The tack may be considered to be the amount of force in grams resistance on the probe as it is pulled out of the gel when the probe is withdrawn at a speed of 2.0 mm/second from the preset penetration depth.

An alternative way to characterize the gels is by cone penetration parameters according to ASTM D-217 as proposed in Debbaut '261; Debbaut '207; Debbaut '746; and U.S. Pat. No. 5,357,057 to Debbaut et al., each of which is incorporated herein by reference in its entirety. Cone penetration ("CP") values may range from about 70 ($10^{-1}$ mm) to about 400 ($10^{-1}$ mm). Harder gels may generally have CP values from about 70 ($10^{-1}$ mm) to about 70 ($10^{-1}$ mm). Softer gels may generally have CP values from about 200 ($10^{-1}$ mm) to about 400 ($10^{-1}$ mm), with particularly preferred range of from about 250 ($10^{-1}$ mm) to about 375 ($10^{-1}$ mm). For a particular materials system, a relationship between CP and Voland gram hardness can be developed as proposed in U.S. Pat. No. 4,852,646 to Dittmer et al.

According to some embodiments, the gel has a Voland hardness, as measured by a texture analyzer, of between about 5 and 100 grams force. The gel may have an elongation, as measured by ASTM D-638, of at least 55%. According to some embodiments, the elongation is of at least 100%. The gel may have a stress relaxation of less than 80%. The gel may have a tack greater than about 1 gram.

While, in accordance with some embodiments, the sealants 160, 170 are gels as described above, other types of sealants may be employed. For example, the sealants 160, 170 may be silicone grease or hydrocarbon-based grease.

The enclosure assembly 100 may be formed in the following manner. The cover members 122, 124 and the hinge 126 may be integrally formed. According to some embodiments, the cover members 122, 124 and the hinge 126 are unitarily molded. According to some embodiments, the entirety of the housing 120 is unitarily molded. The housing 120 may be injection molded or vacuum formed, for example. According to other embodiments (e.g., if the cover members are not hinged), the cover members 122, 124 are separately molded or otherwise formed.

Figure 16:
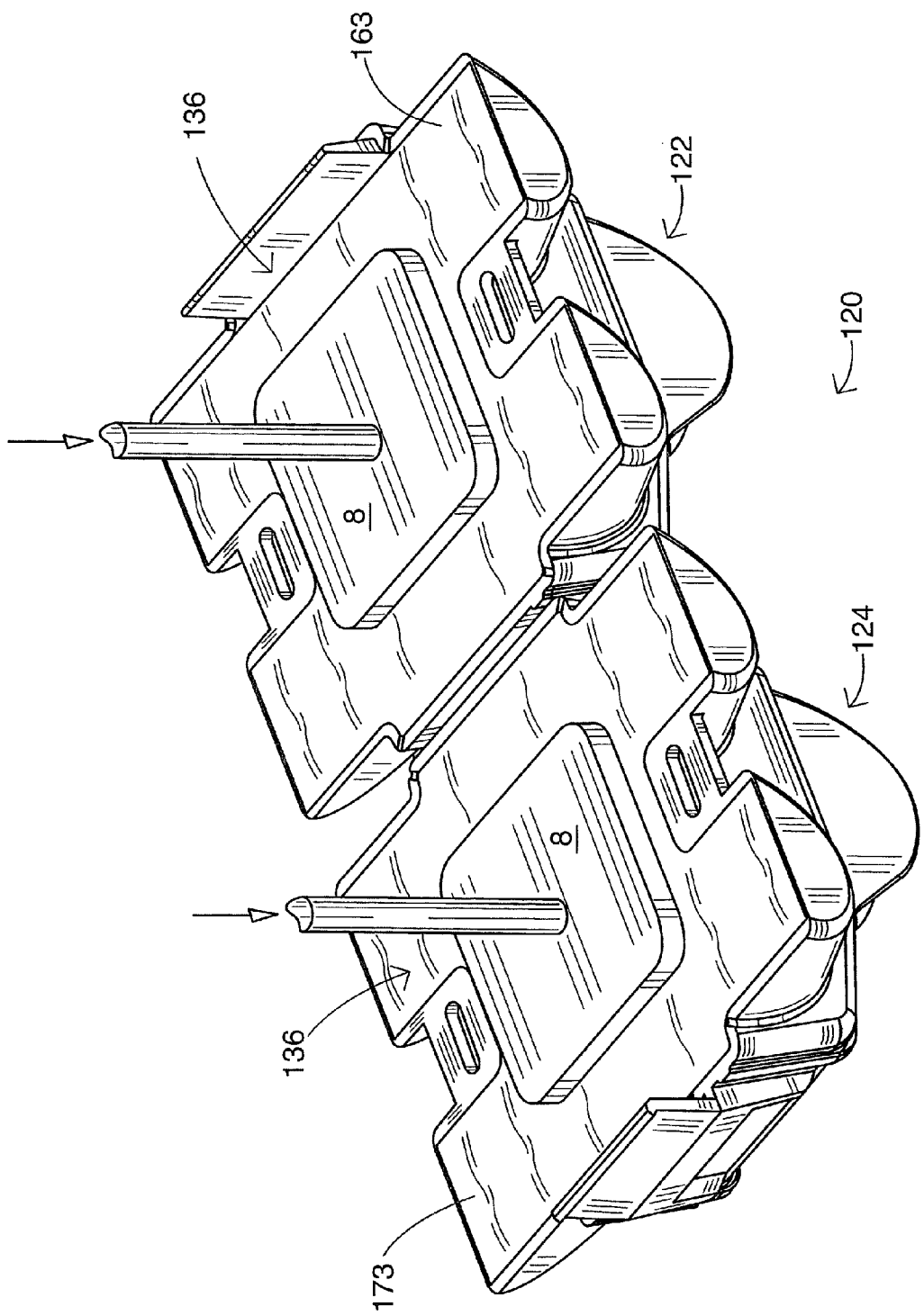
FIGS. 16 and 17 illustrate methods for forming the enclosure assembly of FIG. 1.
Figure 17:
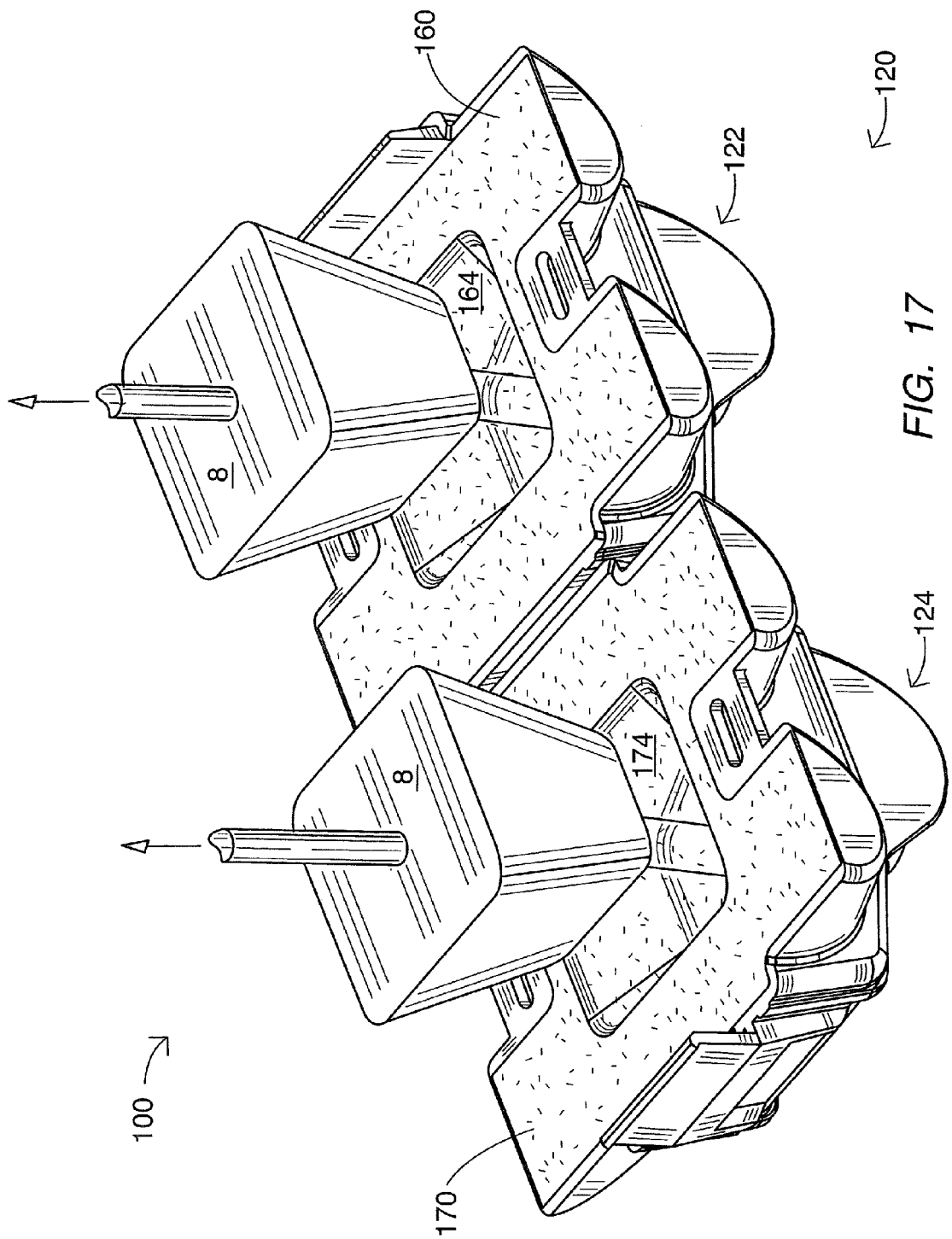

If the sealant 160, 170 is a material, such as a curable gel, that requires curing, the sealant may be cured in situ. According to some embodiments, and with reference to FIGS. 16 and 17, the sealants 160, 170 may be formed as follows. Spacer inserts 8 having the shape and size of the voids 164, 174 are placed in each cavity 136. The housing 120 is oriented so that the cavities 136 are open upwardly as shown in FIG. 16. Liquid, uncured sealant 163, 173 is dispensed into the cavities 136 such that it fills the cavities 136 of the cover members 122, 124 up to the desired level. The sealant may then be cured in situ. The spacer inserts 8 may be held in place using clips, a jig or the like to properly register the spacer inserts with the cover members 122, 124 and to prevent the spacer inserts 8 from floating out of the liquid sealant. The spacer inserts 8 are then removed as shown in FIG. 17 to provide the voids 164, 174 in the sealants 160, 170. The liquid, uncured sealant 163, 173 may instead be inserted first and then displaced by insertion of the spacer inserts 8 prior to curing the uncured sealant. As will be apparent to those skilled in the art from the description herein, sealant-filled enclosures of the present invention may be formed by other methods. For example, a pre-cured sealant may be introduced into the cavities 136 (e.g., around the spacer inserts 8).

With reference to FIGS. 8-15, the connector system 20 can be used as follows in accordance with methods of the present invention to form the enclosed connection 24 (FIGS. 12-15). Generally, the connection 22 is first formed by installing the connector 50 on the conductors 12, 14. Thereafter, the enclosure assembly 100 is installed over the connection 22 and portions of the conductors 12, 14.

The connector 50 can be used as follows in accordance with methods of the present invention to form the connection 22 (FIGS. 9 and 10). The bolt 56 may be initially inserted through the bores 80, 82 and the nut 57 loosely threaded onto the bolt 56 so that the connector members 60, 62 can be separated into an open position (e.g., as shown in FIG. 8). In the open position, the conductor passages 52, 54 open sidewardly to permit lateral insertion of the conductors 12, 14 into the respective passages 102, 104. The bolt 56 holds the connector members 60, 62 together and the widths of the connector members 60, 62 prevent over-rotation about the bolt 56 so that the proper relative orientation between the connector members 60, 62 can be easily maintained. The installer inserts the conductors 12, 14 into the passages 52, 54 as shown in FIG. 8. According to some embodiments, the conductor 14 is a main electrical power line or conductor, the connector member 62 is first hooked onto the conductor 14 (i.e., the conductor 14 is positioned in the passage 54), and the conductor 12, which may be a tap electrical power line or conductor, is then positioned in the passage 52. The U-shaped hook portions 70 may serve to temporarily retain the conductors 12, 14 in the passages 52, 54. The conductors 12, 14 are aligned in parallel along the connector axis K-K.

With the conductors 12, 14 in position as described above, the installer rotates the bolt 56 in any suitable manner to tighten the connector 50. According to some embodiments, the bolt 56 is rotated using a driver such as the driver 26 (FIG. 10). The driver 26 includes a socket 26A configured to engage and drive the head 56B and a power tool 26B to drive the socket 26A. According to some embodiments, the power tool 26B is a battery-powered tool. According to some embodiments, the power tool 26B is a rechargeable battery-powered tool.

As the bolt 56 is rotated, the bolt 56 draws the connector members 60, 62 together along the translation axis M-M into a nested configuration. The respective portions 70, 74 are thereby driven or translated towards one another along axes N-N parallel to the axis M-M. The abutment faces 76 are angled or sloped with respect to the axes N-N so that they present wedge surfaces that increasingly bear against the conductors 12, 14 as the abutment faces 76 translate inwardly or converge along the axes N-N. The conductor passages 52, 54 are thereby simultaneously reduced about the conductors 12, 14. The abutment portions 74 are thus driven in a direction transverse to the axes J-J of the conductors 12, 14 to clamp the connector members 60, 62 about the conductors 12, 14.

According to some embodiments, the engagement between the inner ends of the abutment portions 74 and the inner sides of the respective bends 68 serves as a displacement stop mechanism to limit the final nesting position of the connector members 60, 62. As the connector members 60, 62 are pulled together, the facing surfaces of the abutment portions 74 may slide across one another. The configuration of the connector 50 including the oblique angle between the axis M-M and the axis K-K may facilitate operation of the clamping mechanism 55 by positioning the bolt head 56B for convenient access with the driver 26.

The installer continues to rotate and torque the bolt 56 until the conductors 12, 14 are engaged by each of the seat surfaces 72, 76 and loaded thereby as desired. The connector 50 may collapse or deform the conductors 12, 14 in the passages 52, 54. The seat surfaces 72, 76 may form an interference fit with the conductors 12, 14. The clamping mechanism 55 maintains the connector 50 in this clamping position (as shown in FIGS. 9 and 10). The U-shaped hook portions 70 form end enclosures that prevent endwise pullout of the conductors 12, 14 from the connector 50.

The arrangement of the connector 50 and its clamping mechanism 55 may serve to efficiently and reliably transfer the tensile force from the bolt 56 to the conductors 12, 14. According to some embodiments, the seat surfaces 72, 76 apply a clamping or compression load of at least about 3000 lbs to the conductors 12, 14 when the connector 50 is in the clamping position. According to some embodiments, the seat surfaces 72, 76 apply a clamping load in the range of from about 1500 to 7500 lbs.

According to some embodiments, the bolt 56 is rotated and the conductors 12, 14 are loaded such that the connector members 60, 62 are elastically and plastically deflected. According to some embodiments, the U-shaped hook portions 70 are elastically deflected within the "U" and/or about the bends 68. According to some embodiments, the leg sections 66 are elastically deflected about the bends 68. As a result of the elastic deformation of the connector members 60, 62, potential energy is stored in the connector members 60, 62 (e.g., between bends 68) so that the hook portions 70 are thereby spring-biased against the received conductors 12, 14.

In use, this spring bias may serve to compensate for physical and environmental variations over the life of the connection 22, such as variations caused by heat and cooling, wind, relaxation, etc. In this way, the elastic deflection may help to ensure a consistently strong or adequate connection.

Figure 13:
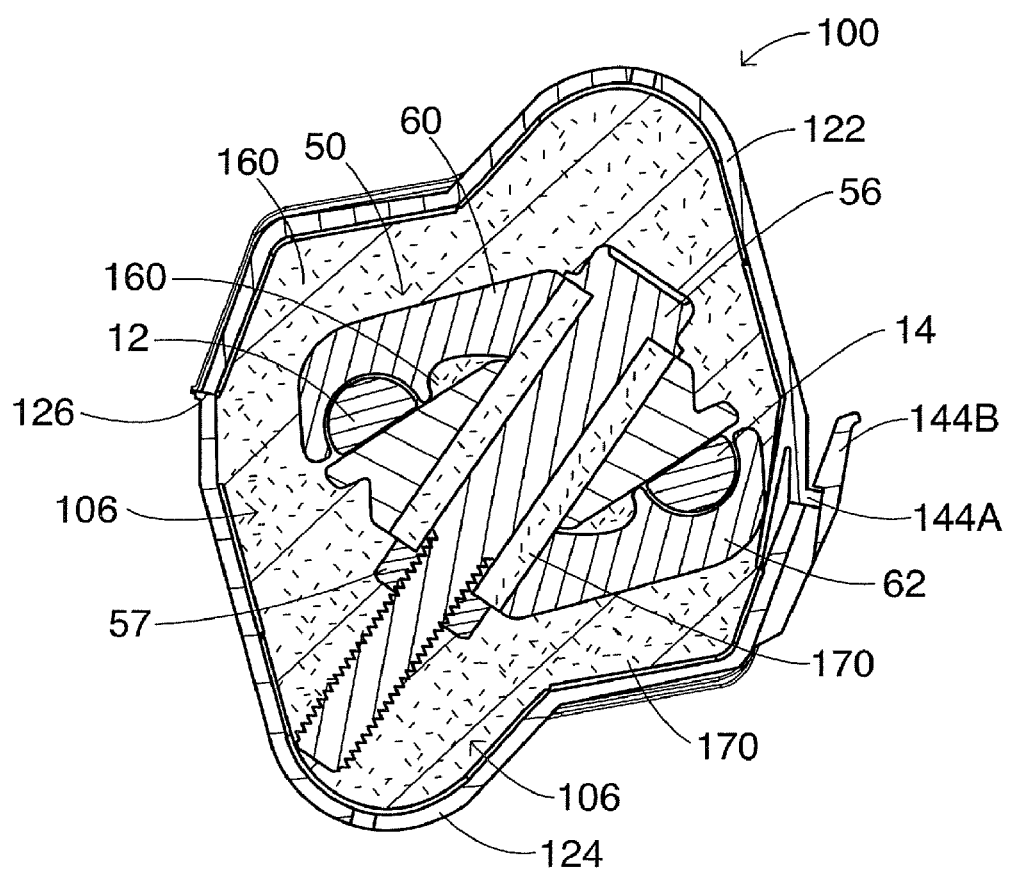
FIG. 13 is a cross-sectional view of the enclosed connection assembly of FIG. 1 taken along the line 13-13 of FIG. 12.
Figure 14:
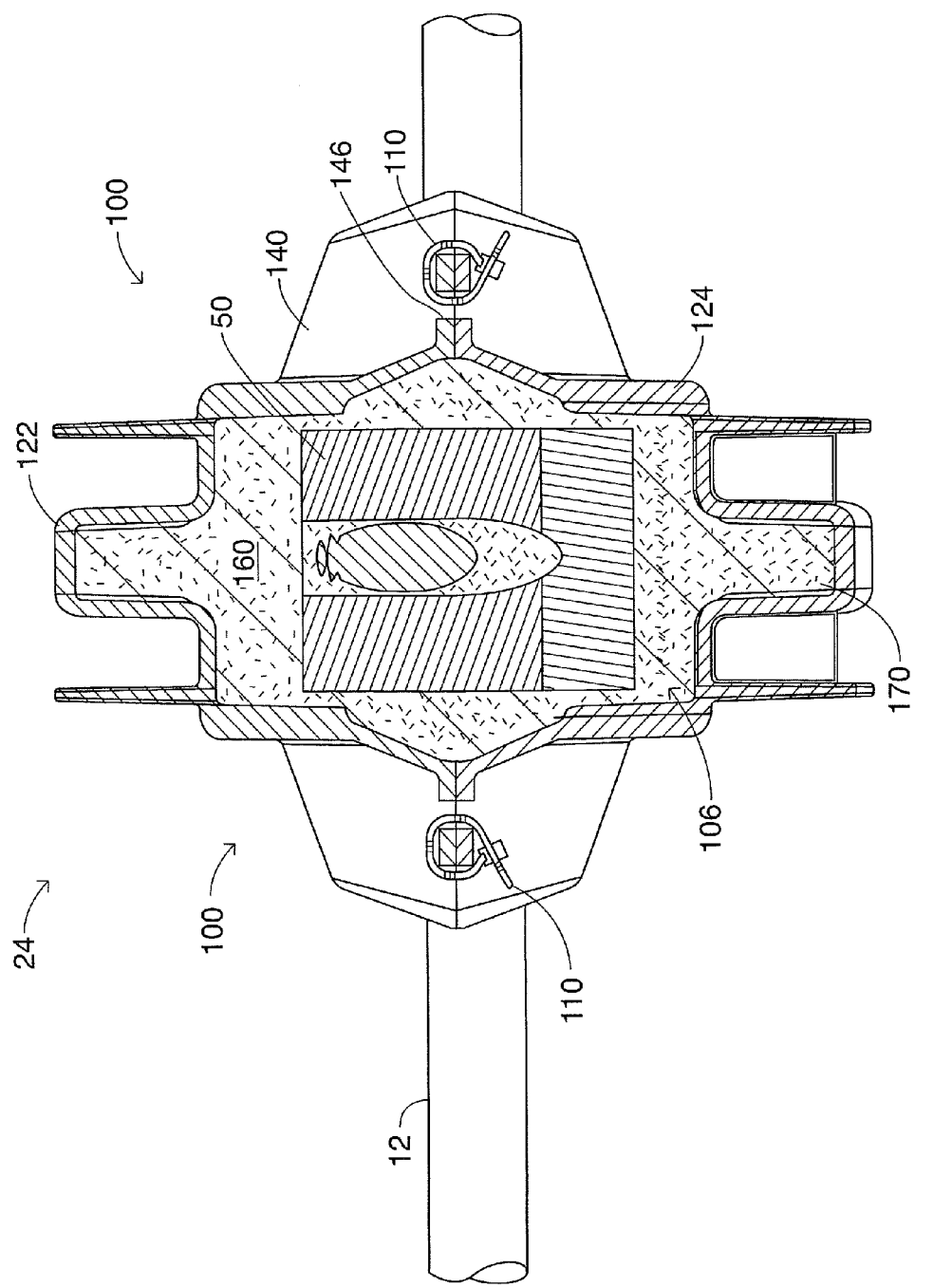
FIG. 14 is a cross-sectional view of the enclosed connection assembly of FIG. 1 taken along the line 14-14 of FIG. 12.
Figure 15:
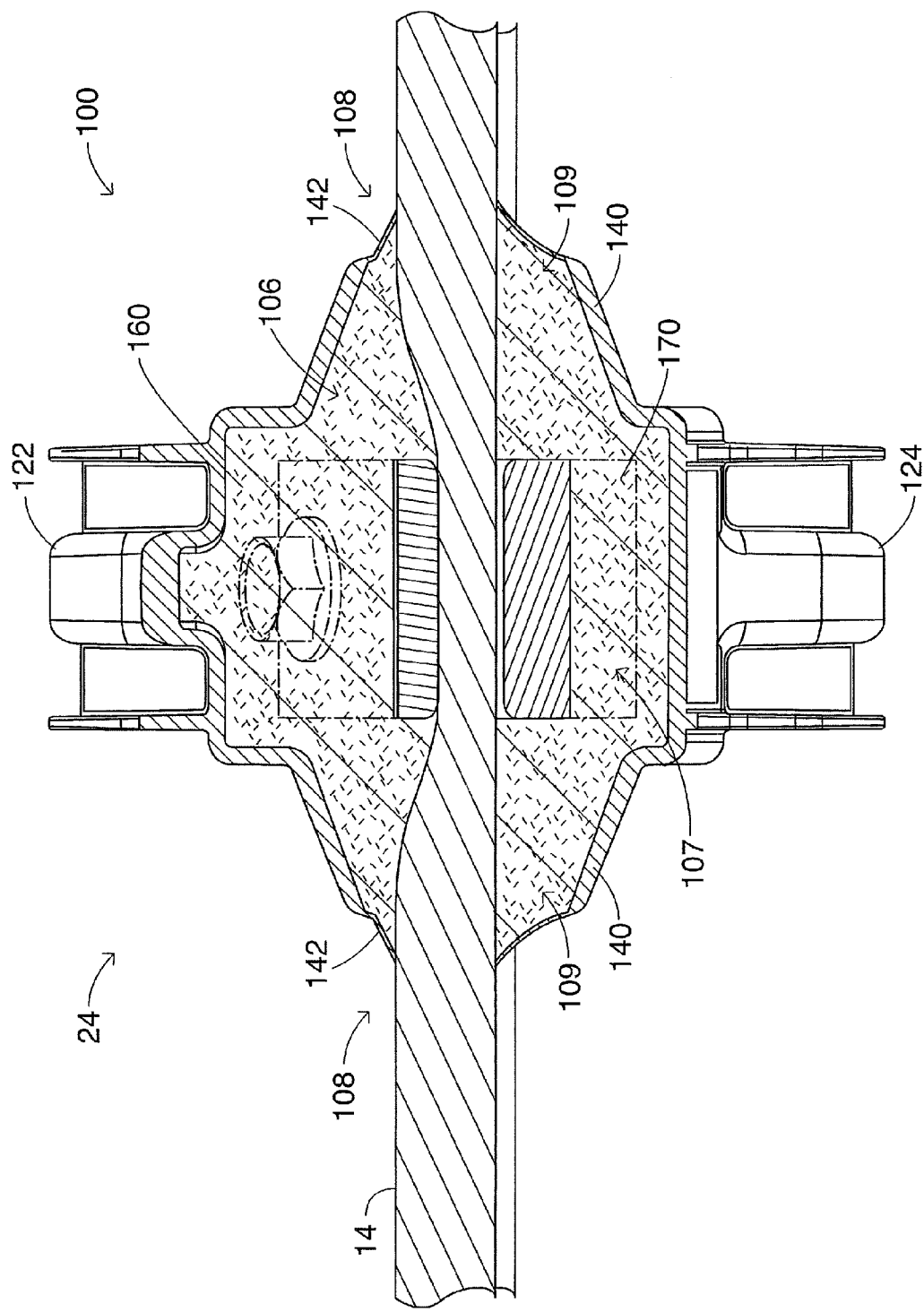
FIG. 15 is a cross-sectional view of the enclosed connection assembly of FIG. 1 taken along the line 15-15 of FIG. 12.

Once the connection 22 has been constructed as described above, the enclosure assembly 100 is installed on the connection 22 and the conductors 12, 14. The enclosure assembly 100 may be held in a fully or partially open position as shown in FIG. 11 and the connection 22 may be inserted between the cover members 122, 124. The enclosure assembly 100 is then closed by urging one or both of the cover members 122, 124 to relatively pivot about the hinge 126 into engagement as shown in FIGS. 12-15, such that the latch structures 144A, 144B are made to lock in the closed position. With reference to FIG. 15, the ties 110 may then be inserted through the tie slots 146 and secured to secure the cover members 122, 124 in the closed position. The closed housing 120 defines an enclosure cavity 106 including a main enclosure cavity 107 and contiguous port channels 109 (collectively defined by the port extensions 140). The connector 50 is received in the voids 164, 174 (FIG. 1) of the sealants 160, 170. The connection 22 is encapsulated within the sealant 160, 170, and the sealant 160, 170 and the connection 22 are in turn encapsulated within the housing 120 (i.e., contained within the enclosure cavity 106). The portions of the conductors 12, 14 within the connection 22 and extending from the connection 22 and through the port channels 109 to the frangible walls 142 are likewise encapsulated in the sealant 160, 170.

According to some embodiments, the connection 22 is first placed in the cover member 124 of the enclosure assembly 100 (as shown in FIG. 11). More particularly, the connector 50 may be placed or seated in the pre-defined void 174 as shown in FIG. 11 such that the connector 50 may be partially encapsulated in the sealant 170. The cover 122 is then closed on the cover 124 so that the exposed portion of the connector 50 is received in the pre-defined void 164 and so that this portion of the connector 50 is encapsulated in the sealant 160. It will be appreciated that the order may be reversed so that the connector 50 is instead first placed in the cover member 122 before closing the enclosure assembly 100.

Prior to or as the enclosure assembly 100 is closed, the conductors 12, 14 may break or splay the frangible walls 142 so that the conductors 12, 14 pass therethrough and are generally surrounded thereby. Because the walls 142 may be angled outwardly, they tend to be splayed outwardly by the conductors 12, 14.

During the installation steps of inserting the connector 50 into the cover members 122, 124 and following installation, the locator ribs 148 can serve as centering stops to positively locate the connector 50 with respect to the housing 120. In this manner, the locator ribs can ensure that a desired minimum standoff is provided as needed to provide an effective encapsulation by the sealant 160, 170.

According to some embodiments and as illustrated, the volumes and configurations of the sealants 160, 170 are selected to ensure that the connection 22 displaces at least one, and according to some embodiments, both of the sealants 160, 170 when the enclosure assembly 100 is transitioned from the opened position to the closed position with the connection 22 disposed therein.

According to some embodiments, the combined volume of the connector 50, the portions of the conductors 12, 14 in the enclosure cavity 106, and the sealants 160, 170 is greater than the volume of the enclosure cavity 106.

According to some embodiments and as illustrated, the volume of the enclosure cavity 106 is greater than the combined volume of the sealants 160, 170, but the volume of the enclosure cavity 106 not filled with the sealants 160, 170 is less than the volume of the connection 22 (i.e., the connector 50 and the portions of the conductors 12, 14 in the enclosure cavity 106).

According to some embodiments, the combined volume of the voids 164, 174 is less than or equal to the volume of the connector 50. According to some embodiments, the sum of the volumes of the voids 164, 174 is in the range of from about zero to 95 percent of the volume of the connector 50 and, according to some embodiments, in the range of from about 25 to 95 percent of the volume of the connector 50.

According to some embodiments, when the enclosure assembly 100 is installed as described herein, the closing of the cover members 122, 124 about the connection 22 forcibly displaces the sealants 160, 170 about the connector 50 such that the sealants 160, 170 flow around the connector 50 and, in some cases, into interstices within the connector 50. According to some embodiments, the sealants 160, 170 substantially fully encapsulate the connector 50 as illustrated in FIGS. 13-15. According to other embodiments, the sealants 160, 170 only partially surround the connector 50 (e.g., in the case where the voids 164, 174 extend to the bottom walls 130).

By configuring the voids 164, 174 to have a combined volume less than the volume of the connector 50, the enclosure assembly 100 may ensure that the housing 120 can be closed without requiring undue force, but nonetheless that the sealants 160, 170 are displaced and forced to flow about the connection 22 and also that the sealants 160, 170 sufficiently engage with one another at the interface between the cover members 122, 124.

The side walls 132 (FIG. 3), the end walls 134 (FIG. 4) and the port extensions 140 (FIG. 5) may have slopes that tend to cause each sealant 160, 170 to flow toward the top opening 138A of its respective cover member 122, 124 to promote flow of the sealant about the connection 22 and into engagement with the other sealant 160, 170.

According to some embodiments, substantially all of the sealant 160, 170 is retained in the housing 120 when the housing 120 is closed about the connection 22. However, according to some embodiments, some of the sealant 160, 170 may be forced out of the enclosure cavity 106 (e.g., through the ports 108 and/or other opening(s)).

As will be appreciated from the description herein, the sealant 160, 170 engages portions of the conductors 12, 14 to form seals thereabout. The sealant 160, 170 also forms a sealing block that surrounds the connector 50, thereby sealing the connector 50. Notably, in the illustrated enclosure assembly 100, the sealant masses 160, 170 connect with one another to encapsulate the connector 50 and conductors 12, 14.

The enclosure assembly 100 may be sized and configured to accommodate and seal multiple or a range of sizes of connectors 50 and conductors 12, 14.

The enclosure assembly 100 may provide a number of advantages. The enclosure assembly 100 may provide a reliable seal about the connection 22. This seal may prevent or inhibit the ingress of moisture that would otherwise cause corrosion of the connection 22. The sealant 160, 170, particularly gel sealant, may accommodate conductors of different sizes within a prescribed range. The interfacing sealant masses 160, 170 and the relationship between the connector or connection volume and the sealant volumes (and the void 164, 174 volumes, if provided) may ensure that a suitable seal is provided by and between the sealant masses for a broadened range of sizes connections 22 positioned in the enclosure assembly 100.

When the sealant 160, 170 is a gel, the conductors 12, 14 and the housing 120 may apply a compressive force to the sealant 160, 170 as the assembly 100 is transitioned from the open position to the closed position. The gel may thereby be elongated and be generally deformed and substantially conform to the outer surfaces of the connector 50, the conductors 12, 14 and to the inner surface of the housing 120. Some shearing of the gel may occur as well. At least some of the gel deformation may be elastic. The restoring force in the gel resulting from this elastic deformation generally causes the gel to operate as a spring exerting an outward force between the housing 120 and the connector 50 and the conductors 12, 14. The compressive loading and restoring force are maintained by the closure of the cover members 122, 124.

Various properties of the gel as described above may ensure that the gel sealant 160, 170 maintains a reliable and long lasting seal between the housing 120 and the connector 50 and the conductors 12, 14. The elastic memory of and the retained or restoring force in the elongated, elastically deformed gel generally cause the gel to bear against the mating surfaces of the connector 50, the conductors 12, 14 and the interior surface of the housing 120. Also, the tack of the gel may provide adhesion between the gel and these surfaces. The gel, even though it is cold-applied, is generally able to flow about the connector 50, the conductors 12, 14 and the housing 120 to accommodate their irregular geometries.

According to some embodiments, the sealant 160, 170 is a self-healing or self-amalgamating gel. This characteristic, combined with the aforementioned compressive force between the connector 50, conductors 12, 14 and the housing 120, may allow the sealant 160, 170 to re-form into a continuous body if the gel is sheared by the insertion of the conductors 12, 14 into the enclosure assembly 100. The gel may also re-form if the connector 50 and conductors 12, 14 are withdrawn from the gel.

The sealant 160, 170, particularly when formed of a gel as described herein, may provide a reliable moisture barrier for the conductors 12, 14 and the connector 50, even when the enclosure assembly 100 is subjected to extreme temperatures and temperature changes. The housing 120 may be made from an abrasion resistant material that resists being punctured by the abrasive forces.

The gel sealant may also serve to prevent or inhibit corrosion of the connection 22 by depositing a layer of oil from the gel on the exposed surfaces of the connector 50 and conductor portions 12, 14 in the enclosure cavity 106. Even if the gel is removed from the connection 22, the oil may remain to coat the connection surfaces as a barrier to moisture.

As will be appreciated from the description herein, enclosure assemblies according to the present invention may be provided as pre-formed and fully assembled units, with pre-cured gel or other sealant therein as described above, that may be cold applied about a connection to form a seal.

While, in accordance with some embodiments, the housing 120 is integrally and unitarily formed, the housing may be otherwise fanned in accordance with some aspects of invention. For example, the cover members 122, 124 and/or the hinge 126 may be separate parts joined together in hinged fashion or otherwise. For example, the cover members 122, 124 may be separate pieces secured together by tie wraps, snaps, latches or the like and/or not hinged.

It will be appreciated that enclosures in accordance with the present invention may have components (e.g., cover members, walls, etc.) and cavities or chambers having shapes, configurations and/or sizes different than those shown and described herein.

According to some embodiments, the voids 164, 174 are substantially centered with respect to the cavities 136. According to some embodiments, the voids may instead be offset.

According to some embodiments, the voids 164, 174 extend all the way to the bottom walls 130.

According to some embodiments, an enclosure assembly 100 as described herein may be formed without the sealant voids 164, 174 (i.e., the cover members 122, 124 are solid filled up to a desired level). In this case, portions of the sealants 160, 170 may be forced out of the enclosure cavity 106 (e.g., through the ports 108 and/or other openings). This modified enclosure assembly can be formed in the same manner as described above for the enclosure assembly 100 except that the aforementioned spacer inserts are omitted.

According to some embodiments, a housing as disclosed herein (e.g., the housing 120) may be used to enclose a connection including a transverse wedge connector (e.g., the connection 22) without the provision of sealant (e.g., the sealants 160, 170) therein. Such a sealant-free housing may provide touch protection.

According to some embodiments, the enclosure assembly 100 and the connector 50 are pre-configured or packaged as a matched kit. However, the enclosure assembly 100 and the connector 50 need not be provided as a kit. For example, the enclosure assembly 100 may be retrofitted onto a connector 50 that has been previously installed, even years prior.

Connectors according to embodiments of the invention may employ more or fewer clamping mechanisms than shown for the exemplary embodiments. According to some embodiments, other types of clamping mechanisms may be employed.

The methods and connector assemblies in accordance with embodiments of the present invention may provide the advantages of relatively slow displacement tools (including battery-powered tools). As compared to at least some explosive actuated tools, the present methods and connector assemblies may provide improvements in simplicity, safety, speed, reduction in training requirements, environmental impact, ergonomics, and cost savings. Hand and battery operated tools may also be employed in countries, environments and applications where use of explosives is limited.

According to some embodiments, the conductors 12, 14 are power transmission conductors. According to some embodiments, the conductors 12, 14 are aerial power transmission conductors. According to some embodiments, the conductor 14 is a main line electrical conductor and the conductor 12 is a tap line electrical conductor. According to some embodiments, the conductors 12, 14 each include a plurality of elongate strands (e.g., helically wound strands). The conductors 12, 14 may be insulated or uninsulated. According to some embodiments, one of the conductors 12, 14 may be replaced with a bar, stirrup or the like.

According to some embodiments, the conductors 12, 14 have a diameter of from about 3/16 to 1.5 inches.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An enclosed connection system for connecting first and second elongate electrical conductors, the enclosed connection system comprising:
   a) a transverse wedge connector including:
       an electrically conductive first connector member including:
           a first body having inner and outer opposed ends;
           a first hook portion on the outer end of the first body, the first hook portion defining a first channel to receive the first conductor; and
           a first abutment portion on the inner end of the first body;
       an electrically conductive second connector member including:
           a second body having inner and outer opposed ends;
           a second hook portion on the outer end of the second body, the second hook portion defining a second channel to receive the second conductor; and
           a second abutment portion on the inner end of the second body; and
       a clamping mechanism selectively operable to displace the first and second connector members relative to one another from an open position to a clamping position to clamp the first conductor in the first channel and between the first hook portion and the second abutment portion and to clamp the second conductor in the second channel and between the second hook portion and the first abutment portion to thereby form a connection; and
   b) an enclosure configured to receive and cover the connection and to protect the transverse wedge connector;
   wherein the enclosure includes:
       first and second cover members defining first and second cover member cavities, respectively;
       a first flowable sealant disposed in the first cover member cavity and a second flowable sealant disposed in the second cover member cavity to provide a seal about the transverse wedge connector;
       wherein the first and second cover members are relatively movable between an open position to receive the connection and a closed position wherein the first and second cover members define an enclosure cavity to receive the transverse wedge connector and contain the connection such that the transverse wedge connector is encapsulated in the first and second sealants; and
       wherein the enclosure is configured such that the transverse wedge connector will displace the first and second sealants when the first and second cover members are moved from the open position to the closed position about the transverse wedge connector; and
   wherein:
       the transverse wedge connector has a connector volume;
       the first and second sealants include first and second voids, respectively, defined therein to receive the transverse wedge connector, the first and second voids having a first void volume and a second void volume, respectively; and
       the sum of the first void volume and the second void volume is less than the connector volume.

2. The enclosed connection system of claim 1 wherein the sealant is a gel.

3. The enclosed connection system of claim 1 wherein first and second sealants are first and second gels adapted to be elongated and elastically deformed in the closed position when the transverse wedge connector is disposed in the enclosure cavity.

4. The enclosed connection system of claim 1 wherein the sum of the first void volume and the second void volume is between about 25 and 95 percent of the connector volume.

5. The enclosed connection system of claim 1 wherein the enclosure includes:
   a main cavity to receive the transverse wedge connector;
   a conductor port configured to receive the first conductor therethrough; and
   a conductor channel fluidly connecting the conductor port with the main cavity, wherein the conductor channel tapers inwardly in a direction from the conductor port to the main cavity.

6. The enclosed connection system of claim 1 wherein each of the first and second cover members includes:
   a bottom wall; and
   a sidewall extending from the bottom wall and defining an opening opposite the bottom wall to receive the transverse wedge connector, at least a portion of the sidewall being sloped outwardly in a direction from the bottom wall to the opening.

7. The enclosed connection system of claim 1 wherein the enclosure includes:
   a conductor port configured to receive the first conductor therethrough; and
   a frangible port wall extending across the conductor port.

8. The enclosed connection system of claim 1 wherein the enclosure includes
   at least one locator feature to position the transverse wedge connector in the enclosure cavity.

9. The enclosed connection system of claim 1 wherein
   the enclosure cavity has a shape that substantially conforms to a shape of the transverse wedge connector.

10. The enclosed connection system of claim 1 wherein:
    the first and second cover members are pivotally connected by a hinge; and
    the first and second cover members are relatively pivotable about the hinge between the open position and the closed position.

11. The enclosed connection system of claim 1 wherein:
    the clamping mechanism is selectively operable to translate the first and second connector members relative to one another from the open position to the clamping position along a translation axis;
    a connector axis extends through the first and second channels; and
    the translation axis is non-perpendicular to the connector axis.

12. The enclosed connection system of claim 1 including the first and second elongate electrical conductors and wherein:
    the transverse wedge connector electrically and mechanically couples the first and second elongate electrical conductors;
    the clamping mechanism secures and loads the first and second connector members relative to one another to clamp the first conductor in the first channel and between the first hook portion and the second abutment portion and to clamp the second conductor in the second channel and between the second hook portion and the first abutment portion to thereby form a connection; and
    the enclosure covers the connection and protects the transverse wedge connector.

13. A method for forming an enclosed connection assembly, the method comprising:
    a) providing a connector comprising:
       an electrically conductive first connector member including:
          a first body having inner and outer opposed ends;
          a first hook portion on the outer end of the first body, the first hook portion defining a first channel; and
          a first abutment portion on the inner end of the first body; an electrically conductive second connector member including:
          a second body having inner and outer opposed ends;
          a second hook portion on the outer end of the second body, the second hook portion defining a second channel; and
          a second abutment portion on the inner end of the second body; and
       a clamping mechanism;
    b) while the connector is in an open position, placing a first conductor in the first channel and a second conductor in the second channel; and thereafter
    c) selectively operating the clamping mechanism of the connector to displace the first and second connector members relative to one another from the open position to a clamping position to clamp the first conductor in the first channel and between the first hook portion and the second abutment portion and to clamp the second conductor in the second channel and between the second hook portion and the first abutment portion to thereby form a connection; and
    d) covering the connection and protecting the transverse wedge connector with an enclosure; wherein the enclosure includes:
       first and second cover members defining first and second cover member cavities, respectively:
       a first flowable sealant disposed in the first cover member cavity and a second flowable sealant disposed in the second cover member cavity to provide a seal about the transverse wedge connector;
       wherein the first and second cover members are relatively movable between an open position to receive the connection and a closed position wherein the first and second cover members define an enclosure cavity to receive the transverse wedge connector and contain the connection such that the transverse wedge connector is encapsulated in the first and second sealants; and
       wherein the enclosure is configured such that the transverse wedge connector will displace the first and second sealants when the first and second cover members are moved from the open position to the closed position about the transverse wedge connector; and
    wherein:
       the transverse wedge connector has a connector volume;
       the first and second sealants include first and second voids, respectively, defined therein to receive the transverse wedge connector, the first and second voids having a first void volume and a second void volume, respectively; and
       the sum of the first void volume and the second void volume is less than the connector volume.

14. An enclosure assembly for use with an electrical connector, the enclosure assembly comprising:
    a cover member defining a cover member cavity to receive the connector; and
    a flowable sealant disposed in the cover member cavity to provide a seal about the connector;

wherein a void is defined in the sealant to receive the connector.

15. A method for forming an enclosure assembly for use with an electrical connector, the method comprising:
providing a cover member defining a cover member cavity to receive the connector;
providing a flowable sealant in the cover member cavity to provide a seal about the connector; and
forming a void in the sealant to receive the connector.

16. The method of claim 15 including:
placing a spacer insert in the cover member cavity;
depositing a liquid, uncured sealant material into the cover member cavity;
with the spacer insert and the liquid, uncured sealant material each disposed in the cover member cavity, curing the liquid, uncured sealant to form the sealant; and
removing the spacer insert from the cover member cavity and the cured sealant, wherein the void is defined in the volume previously occupied by the spacer insert.

17. The enclosure assembly of claim 14 wherein the cover member cavity is configured to receive a transverse wedge connector.

18. The method of claim 15 wherein the cover member cavity is configured to receive a transverse wedge connector.

* * * * *